F. STEDMAN.
Journal-Box.

No. 221,121.       Patented Oct. 28, 1879.

WITNESSES:
Henry N. Miller
C. Sedgwick

INVENTOR:
F. Stedman
BY Munn & Co
ATTORNEYS.

UNITED STATES PATENT OFFICE.

FREDRICK STEDMAN, OF McBRIDE'S, MICHIGAN.

IMPROVEMENT IN JOURNAL-BOXES.

Specification forming part of Letters Patent No. 221,121, dated October 28, 1879; application filed July 29, 1879.

*To all whom it may concern:*

Be it known that I, FREDRICK STEDMAN, of McBride's, in the county of Montcalm and State of Michigan, have invented a new and useful Improvement in Journal-Boxes for Shingle-Machines, of which the following is a specification.

Figure 1:
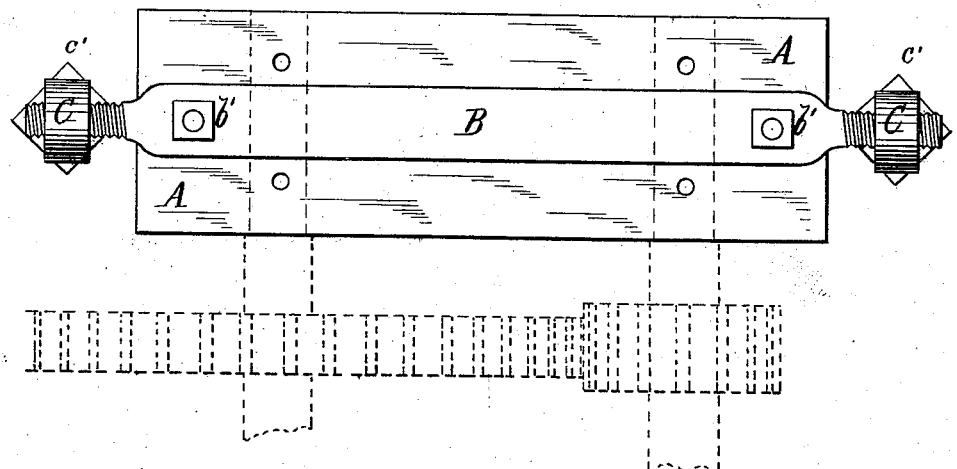
Figure 3:
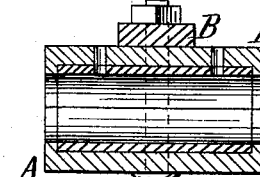
Figure 2:
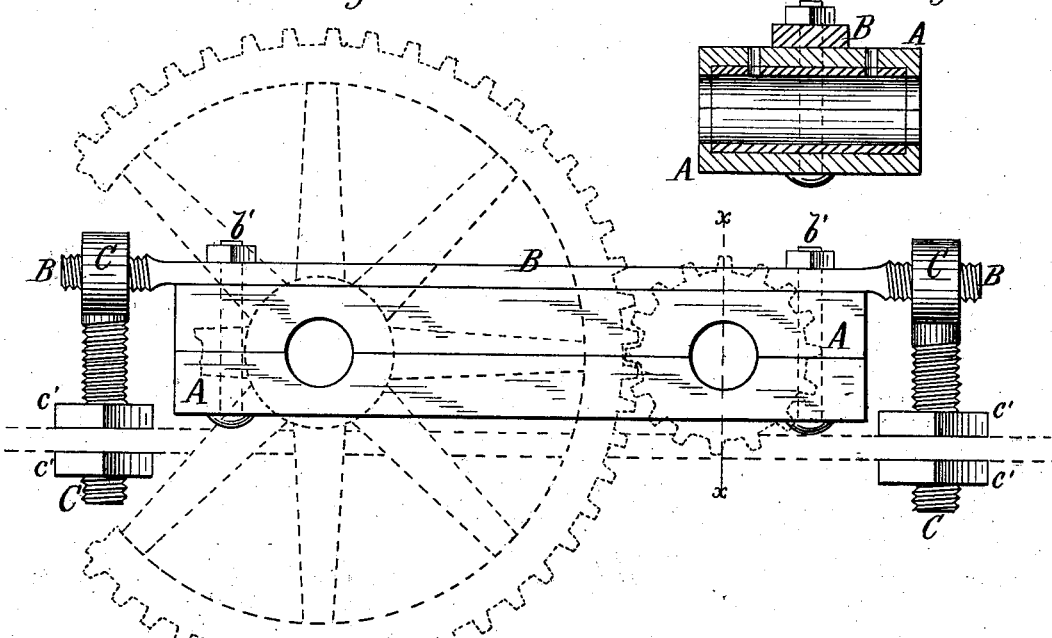

Figure 1 is a top view of my improved journal-boxes. Fig. 2 is a side view of the same. Fig. 3 is a cross-section of the same, taken through the line $x\ x$, Fig. 2.

The object of my invention is to furnish improved journal-boxes for the machine known as "Hall's Shingle-Machine," which shall be so constructed as to allow the shafts to play freely as the gear-wheels are thrown out of and into gear, and which may be adjusted vertically and horizontally, as may be desired.

The invention consists in bearings for the shafts of shingle-machines formed of the block provided with the bearing-holes, the strap, and bolts, and the adjustable eyebolts and nuts with each other, as hereinafter fully described.

Similar letters of reference indicate corresponding parts.

A is the bearing-block, which is formed of wood, and has two holes formed through it to receive the journals of the gearing-shafts, which holes may be lined with metal to prevent wear.

To the upper side of the bearing-block A is secured a strap, B, by two bolts, $b'$, passing through it and through the said block A. The ends of the strap B project beyond the ends of the block A, are rounded off, and pass through the eyes of the bolts C.

The projecting ends of the strap B may have screw-threads cut upon them to fit into the screw-thread cut in the eyes of the bolts C, so that the bearing-block A may be adjusted horizontally by turning the eyebolts one or more times around the said strap; or the ends of the strap B and the eyes of the bolts C may be made smooth, and kept in place by collars placed upon the said ends at the sides of the said eyebolts, and kept in place by set-screws, so that the horizontal adjustment may be made by adjusting the said collars.

The bolts C have screw-threads cut upon them to receive the nuts $c'$, which are screwed upon them, the one above and the other below the bed-plate, or the trip-bar of the machine with which the bearing-boxes are connected.

By this construction the bearing-boxes may be adjusted vertically by adjusting the nuts $c'$ upon the bolts C. With this construction, as the gearing-shafts are moved to throw the machines out of and into gear, the bearings can rock to accommodate themselves to the movements of the said shafts, so that there will be no liability to break the machine, and so that the bearings may be made to fit the said shafts, and thus hold them steady in every position.

Having thus fully described my invention, I claim as new and desire to secure by Letters Patent—

Bearings for the shafts of shingle-machines formed of the block A, provided with the bearing-holes, the strap and bolts B $b'$, and the adjustable eyebolts and nuts C $c'$, with each other, substantially as herein shown and described.

FREDRICK STEDMAN.

Witnesses:
  WALTER F. SMITH,
  E. R. SULLIVAN.